A. S. DUFFIES AND F. MEAD.
CUSHIONED WHEEL.
APPLICATION FILED JAN. 18, 1917.
1,353,325.
Patented Sept. 21, 1920.
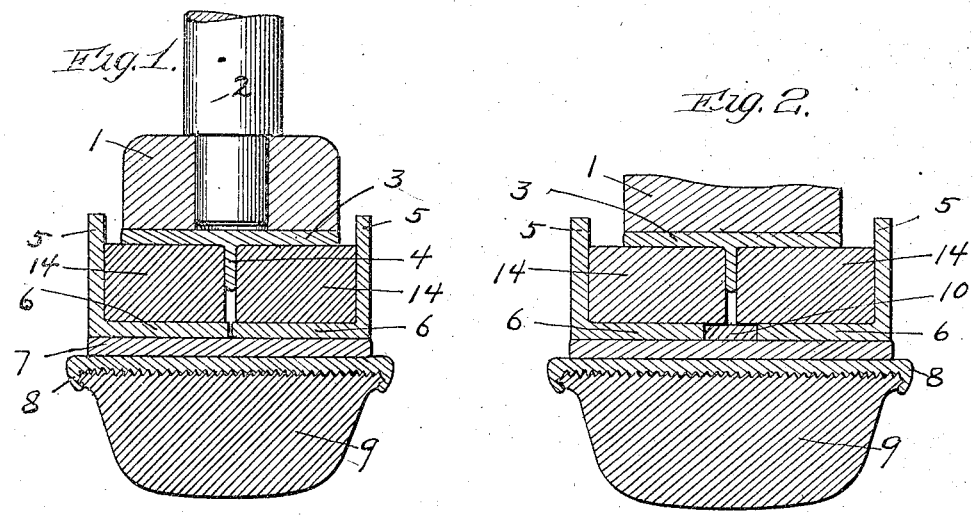
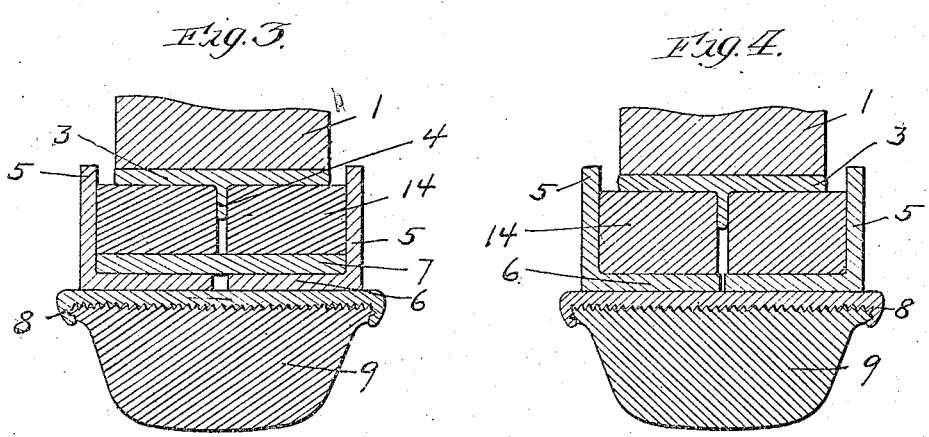
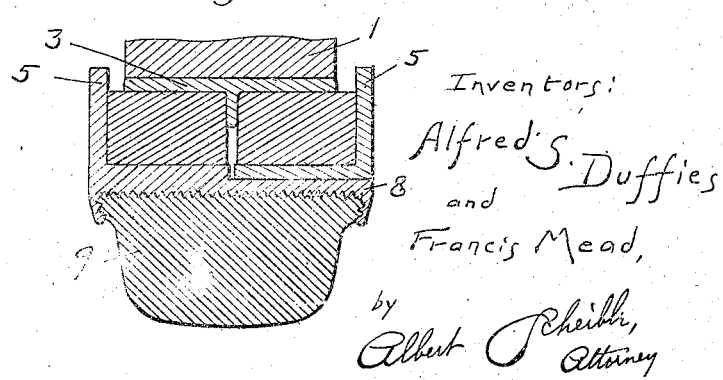
Inventors:
Alfred S. Duffies
and
Francis Mead,
by Albert Scheible,
Attorney

UNITED STATES PATENT OFFICE.

ALFRED S. DUFFIES, OF MARKESAN, WISCONSIN, AND FRANCIS MEAD, OF CHICAGO, ILLINOIS.

CUSHIONED WHEEL.

1,353,325.　　　　　Specification of Letters Patent.　　Patented Sept. 21, 1920.

Application filed January 18, 1917. Serial No. 143,047.

*To all whom it may concern:*

Be it known that we, ALFRED S. DUFFIES, residing at Markesan, in the county of Green Lake and State of Wisconsin, and FRANCIS MEAD, residing at Chicago, in the county of Cook and State of Illinois, both citizens of the United States, have invented certain new and useful Improvements in Cushioned Wheels; and we do hereby declare the following to be a full, clear, and exact description of the invention, such as will enable others skilled in the art to which it appertains to make and use the same.

Our invention relates to inner-cushioned wheels, its general objects being to provide unusually simple and effective means for assembling certain rim portions of the wheel, for easily disassembling the same when desired, for utilizing some of the same parts on wheels of different widths, for including side flanges among the parts thus mounted, and for avoiding the use of auxiliary fastening elements. While various features of our invention may be utilized with substantially equal facility on a number of different types of wheel constructions, its distinctive features as well as its further objects will appear from the following description of its use in connection with wheels embodying the inner cushion construction of U. S. Patent No. 1195379, issued Aug. 22, 1916, to Francis Mead. According to this patent, cushioning elements of rubber or the like are disposed in two annular formations between inner and outer fellies. These elements project beyond the sides of one felly and into contact with side flanges carried by the other felly. Heretofore, such wheel constructions have required the special manufacturing of practically all parts of the wheel and have not even permitted the utilizing of such standardized parts as the so called "S A E bands," or of tread rims standardized to fit over such bands.

To overcome this obstacle to the widespread introduction of inner-cushioned wheels of this general class, and the ready adaptation of the same to standard types of outer tires or other tread rims, our invention aims to provide felly and cushioning elements designed for use in connection with such standardized bands and treads. This may be accomplished in various ways, some of which are illustrated in the five fragmentary sections of the accompanying drawings, all of which are taken along planes axial of the wheels. In the drawings, Figure 1 shows wheel parts including felly and cushioning elements mounted within a standard S A E band and a tread rim carried by the latter.

Fig. 2 shows some of the same parts as used with a wider band and tread rim of the same diameters.

Fig. 3 shows an alternative construction in which the felly parts carrying the side flanges are interposed between a cylindrical band and the tread-carrying rim.

Fig. 4 shows a construction similar to Fig. 1 but with the S A E band omitted.

Fig. 5 shows a construction similar to Fig. 4, but with one of the side flanges integral with the tread-carrying rim.

In the embodiment of Fig. 1, the wheel of our invention includes a wooden inner felly 1 carried by spokes 2 and surrounded tightly by a band 3, which band has a central spacer web 4 projecting from it. Lapping beyond the band 3 radially of the wheel and spaced from this band by rubber cushions 14 are side flanges 5, each of which is integral with a ring 6 contacting with the lateral face of one cushion. Shrunk upon the two rings 6 is a steel band 7, the latter desirably being an S A E band carrying a standard size of rim 8 fitted with a solid rubber tread rim 9. Thus arranged, the inner portions of the wheel can be assembled with the cushions and the flanged companion rings on the same and the parts thus assembled can be substituted for any other wheel formerly used with the same size of S A E band and tread rim. Moreover, the same companion rings (viz. the integral parts 5 and 6) can be used on wider wheels of the same diameter by interposing a spacer band 10 of suitable width, as shown in Fig. 2.

However, while the providing of assembled wheel elements for insertion within the regular S A E bands will simplify the substitution of our wheel construction for other wheel bodies, we do not wish to be limited to these particular arrangements, as modifications might obviously be devised within the spirit of our invention for accomplishing our stated objects. For example, a portion of the arrangement of Fig. 1 might be transposed by interposing a cylindrical band 7 between the companion rings, thus making it easier to slip the latter into place. Or, the band 7 of Fig. 1 may be omitted as in Fig. 4, this being the equivalent of making the band 7 integral with the tread-carrying rim 8. So also, the combining might be carried even further by making one of the companion rings (5, 6) integral with the tread-carrying rim 8, as shown in Fig. 5.

It will be obvious from the above that by constructing wheels in accordance with our invention we entirely eliminate the use of bolts or other fastening elements for securing the side flanges to adjacent rim portions, thereby not only supporting these flanges more rigidly, but also obviating the additional radial space heretofore required to accommodate the bolts. Consequently, we are able to increase the effective length of the spokes for a given diameter of wheel, thus producing lighter wheels without reducing the amount of cushioning. In practice, we have found that owing to the distortion of the rubber cushions by the weight bearing on those cushions which are near the bottom of the wheel, the last named cushions will always be particularly tightly held between the angle-sectioned companion rings and the inner felly band 3. Consequently, any sudden side strain on the wheel (such as that due to a violent skidding) will tend to cramp one or both of these companion rings and will only hold the latter all the more tightly within the rim portions shrunk upon the same. However, by suitably warming the outer rim portions (which may be done without subjecting the same to a temperature injurious to either the tread rim or the cushioning elements), the wheel parts normally tightly embraced by these rim portions may be slid out of the same, thus permitting the tread to be replaced when worn.

We claim as our invention:

1. In a wheel, an annular band, a tread ring thereon, an inner rim spaced from the annular band and having a web extending toward said band, cushions on the rim and laterally engaging the web; and a pair of angle rings having webs respectively in continuous lateral engagement with the cushions along planes parallel to the medial plane of the wheel, and having their other webs secured between the peripheral faces of the cushions and the said annular band; the angle rings being kept from sliding with respect to the said band by the shrinking of the said band over and in engagement with the radial ring webs.

2. In a wheel, a tread member including an annular band; an inner rim spaced from the annular band and having a web extending toward said band, cushioning means between the inner rim and said annular band and laterally engaging the said web; and a pair of angle rings having lateral webs respectively in continuous lateral engagement with the cushioning means, and having peripheral webs disposed between the peripheral faces of the cushions and the said annular band, in contact with each, the said band being shrunk upon the said peripheral webs of the angle rings, whereby the cushions coöperate with the band on the peripheral webs of the angle rings to retain the latter in position.

ALFRED S. DUFFIES.
FRANCIS MEAD.